United States Patent [19]

Gutleber

[11] Patent Number: 4,472,815

[45] Date of Patent: Sep. 18, 1984

[54] PULSE INTERFERENCE CANCELLING SYSTEM FOR SPREAD SPECTRUM SIGNALS

[75] Inventor: Frank S. Gutleber, Little Silver, N.J.

[73] Assignee: The United States of America as represented by the Secretary of the Army, Washington, D.C.

[21] Appl. No.: 423,751

[22] Filed: Sep. 27, 1982

[51] Int. Cl.$^3$ .................... H04B 1/10; H04J 13/00
[52] U.S. Cl. .................... 375/34; 375/96; 375/102; 370/18
[58] Field of Search .................... 370/18-22, 370/53, 69.1, 77, 85, 104, 116; 375/1, 25, 38, 96, 102-104, 34; 340/346, 348, 349; 455/206, 284, 303-306; 364/604, 725, 728, 819, 826

[56] References Cited

U.S. PATENT DOCUMENTS

| | | | |
|---|---|---|---|
| 3,461,451 | 8/1969 | Gutleber | 340/348 |
| 3,634,765 | 1/1972 | Gutleber | 375/96 X |
| 3,870,996 | 3/1975 | Miller | 375/102 |
| 3,908,088 | 9/1975 | Gutleber | 370/104 |
| 4,325,068 | 4/1982 | Mercer | 455/304 X |

OTHER PUBLICATIONS

Weik, Martin H., *Communications Standard Dictionary*, Van Nostrand Reinhold Company, 1983, pp. 56, 200.

*Primary Examiner*—Robert L. Griffin
*Assistant Examiner*—Albert W. Watkins
*Attorney, Agent, or Firm*—Anthony T. Lane; Sheldon Kanars; Jeremiah G. Murray

[57] ABSTRACT

Cancellation of pulse interference with no loss in the received level of the desired signal is obtained for a spread spectrum system which utilizes orthogonal multiplexed noise codes which when orthogonally multiplexed, matched filter detected and linearly added, compress to a lobeless impulse. The noise codes are comprised of binary noise codes which compress to a code bit width $\tau$. The pulse interference is eliminated by means of a variable delay line and a linear adder coupled to the output of a linear adder which operates in combination with a pair of matched filters to provide a lobeless impulse signal. The delay line is varied to provide a 180° phase shift for any pulse interference signal which occurs in time coincidence with the lobeless impulse. The original and phase shifted pulse interference signals are added together in the linear adder and in the process cancel one another while leaving the lobeless impulse signal with no reduction in signal amplitude.

11 Claims, 4 Drawing Figures

MATCHED FILTER FOR CODE a

MATCHED FILTER FOR CODE b

PULSE INTERFERENCE CANCELLING SYSTEM FOR SPREAD SPECTRUM SIGNALS

The invention described herein may be manufactured, used and licensed by or for the Government for governmental purposes without the payment to me of any royalties thereon.

CROSS REFERENCE TO RELATED APPLICATION

This application is related to: U.S. Ser. No. 413,953 (CERCOM D-2289) entitled, "CW Interference Cancelling System For Spread Spectrum Signals", filed in the name of Frank S. Gutleber, the present inventor, on Sept. 1, 1982; U.S. Ser. No. 433,761 CERCOM D-2491, entitled, "CW Interference Cancelling System For Spread Spectrum Signals Utilizing Active Coherent Detection", filed in the name of Frank S. Gutleber, on Oct. 12, 1982; and U.S. Ser. No. 434,668 (CERCOM D-2490), entitled, "Pulse Interference Cancelling System For Spread Spectrum Signals Utilizing Active Coherent Detection", filed in the name of Frank S. Gutleber, on Oct. 15. 1982. The assignee of this related application is also the assignee of the present invention.

FIELD OF THE INVENTION

This invention relates generally to noise code communications systems and more particularly to pulse interference cancelling systems therefor.

BACKGROUND OF THE INVENTION

Noise code communications systems are well known and are particularly desirable because they exhibit an immunity against self-interference and jamming. Noise coded means that the information is coded with a code that is "noise like" in that it will compress to an impulse when detected with a matched filter. In particular, one class of noise codes are known wherein pairs of coded signals termed "code mates" have autocorrelation functions which provide a peak output at a given time and a zero output or outputs having the same magnitude but opposite polarity at all other times. When code mate signals, for example, are multiplexed, matched filter detected, and linearly added, there is provided a lobeless impulse output of a relatively high amplitude at a given time and a zero output at all other times. Such codes and systems utilizing such codes are typically shown and described in U.S. Pat. No. 3,461,451, entitled, "Code Generator To Produce Permutations Of Code Mates", which issued to F. S. Gutleber on Aug. 12, 1969; U.S. Pat. No. 3,634,765, entitled, "System To Provide An Impulse Autocorrelation Function . . . Of One Or More Of Said Code Signals", which issued to F. S. Gutleber on Jan. 11, 1962; and U.S. Pat. No. 3,908,088, entitled, "Time Division Multiple Access Communications System", which issued to F. S. Gutleber on Sept. 23, 1975.

In the above mentioned related application entitled, "CW Interference Cancelling System For Spread Spectrum Signals", there is disclosed an interference cancelling system for continuous wave (CW) or slowly varying continuous wave signals appearing in a noise coded communications system which are eliminated by means of a variable delay line and a linear adder coupled to the output of the receiver prior to matched filter detection and which operates to provide an interference signal from the input interference signal which is exactly 180° out of phase with respect to the input interference signal, which by adding the delayed interference signal to the input interference signal in the linear adder results in total cancellation of the interference signal while the signal level of the noise coded communications signal remains unchanged.

SUMMARY OF THE INVENTION

Accordingly, it is an object of the present invention to provide an improved noise coded communications system.

Another object of the present invention is to provide an improved noise coded communications system which eliminates pulse type interference signals.

Still another object of the present invention is to provide an improved noise coded communications system which eliminates pulse type interference in digital transmission systems while experiencing substantially no loss and degradation of the desired communications signal.

And yet another object of the present invention is to provide a pulse signal canceller for noise coded communications systems which is relatively small in size, weight and extremely low in cost.

Accordingly, these and other objects are achieved by means of an interference pulse canceller comprised of a variable delay line and a linear adder coupled to the composite impulse autocorrelation function output of the receiver portion of the multiplexed noise coded transceiver including a pair of matched filters and a linear adder which is adapted to compress a noise code pair to an impulse having a width $\tau$. The variable delay line is varied to provide a delay of an input interfering pulse of exactly 180° out of phase which is then added to the input interference pulse whereupon the two interference pulse signals are cancelled in the linear adder coupled to the delay line. The composite impulse autocorrelation signal which comprises a lobeless impulse remains substantially unchanged in amplitude in its transition through the pulse canceller; however, one available time slot is lost due to the presence of the delay line.

DETAILED DESCRIPTION OF THE PREFERRED EMBODIMENT

Figure 1:
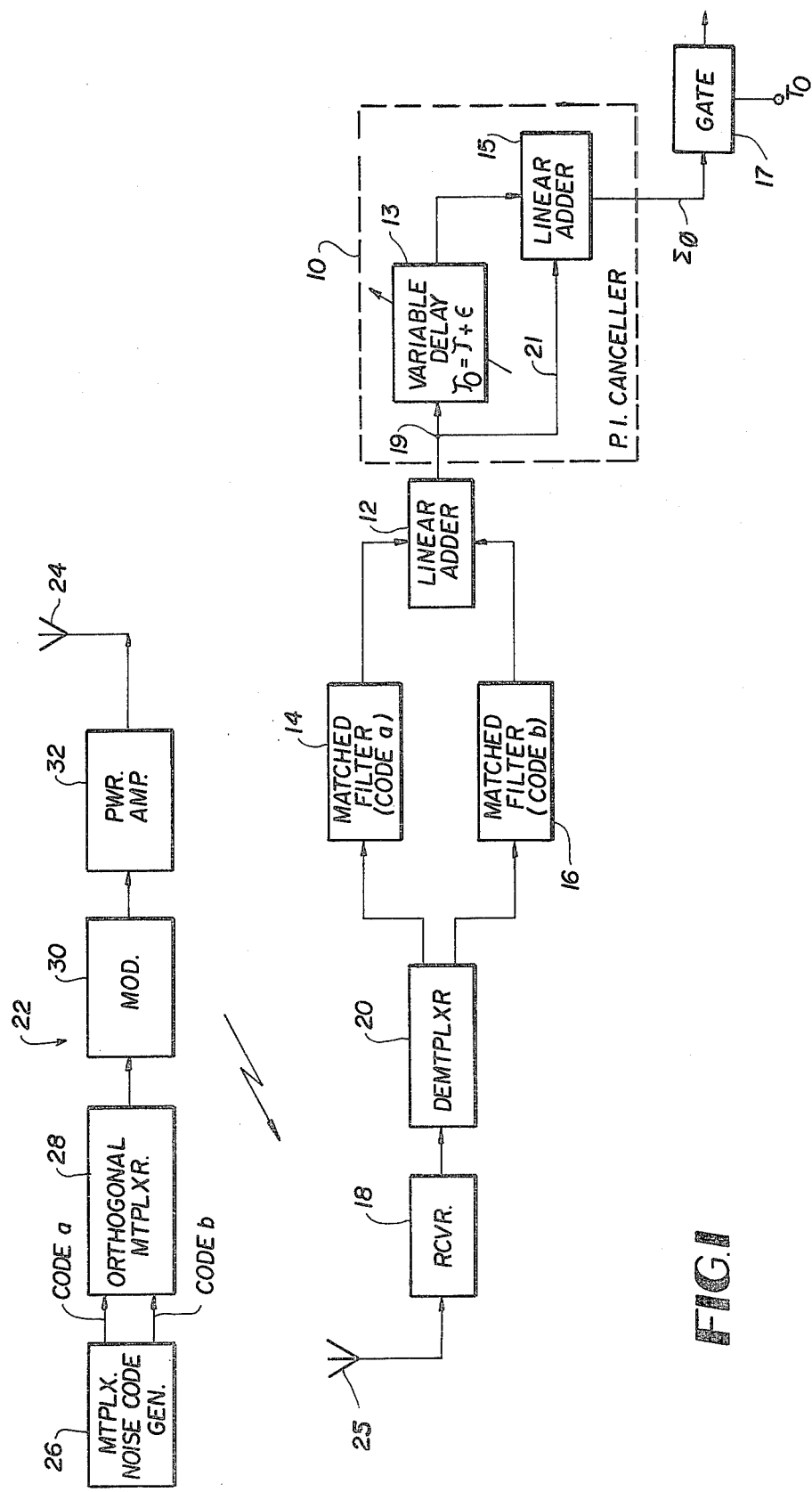
FIG. 1 is a functional block diagram of a noise coded communications link utilizing the pulse interference canceller according to the subject invention.

Referring now to the drawings and more particularly to FIG. 1, reference numeral 10 designates a passive pulse interference (PI) canceller. This pulse canceller is coupled to the summed output provided by a linear adder 12 and two matched filters 14 and 16 which are adapted to provide a composite impulse autocorrelation function signal from a pair of received orthogonally multiplexed noise code signals transmitted to a receiver 18 via a RF carrier signal that is modulated by the noise coded signals. A demultiplexer 20 is shown coupled to the receiver 18 for separating noise codes a and b of the orthogonally multiplexed pair which are respectively coupled to matched filters 14 and 16. The codes a and b are selected from a class of codes formed with code mate pairs that compress to a lobeless impulse upon being detected in matched filters and linearly added and are of the type generally shown and described in the aforementioned U.S. Pat. Nos. 3,461,451; 3,634,765; and 3,908,088.

The receiver 18 forms part of a wireless communications link which includes a transmitter 22 having a transmitting antenna 24 which radiates RF signals to a receiving antenna 25. The transmitter, moreover, includes a dual noise code generator 26 which is coupled to an orthogonal multiplexer 28 whose output is applied to an RF modulator 30. The output of the modulator 30 is coupled to a power amplifier 32 whose output is radiated from the antenna 24.

As noted, the multiplexed noise codes a and b are codes that compress to an impulse autocorrelation function, i.e. a single impulse containing no sidelobes. This is achieved by utilizing code mate pairs that meet the following conditions, namely that the autocorrelation function of the two codes forming a mate pair must be of equal magnitude and opposite sense for all values of time outside of the main lobe. Expressed methematically for the code mate pairs a and b, $$\phi_a(\tau) = -\phi_b(\tau)$$

for all $\tau \neq 0$ where $\phi_a(\tau)$ is the autocorrelation function of code a and $\phi_b(\tau)$ is the autocorrelation function of code b. When the two codes meet this requirement, then the simple linear sum of their orthogonally multiplexed and detected outputs by means of a matched filter, for example, results in compressing the composite code structure into a single lobeless impulse.

Accordingly, as shown in FIG. 1, a code mate pair a and b generated by the code generator 26 and multiplexed by the multiplexer 28 is transmitted to the receiver 18 where it is subsequently demultiplexed in the demultiplexer 20. The output of the demultiplexer 20 comprises separate multibit digital code mate signals corresponding to the above mentioned code a and code b. The matched filters 14 and 16 respectively output the autocorrelation functions $\phi_a(\tau)$ and $\phi_b(\tau)$ which are then coupled to the linear adder 17 which operates to provide a lobeless impulse output $\phi_T(\tau)$ at a time $T_0$.

Figure 2:
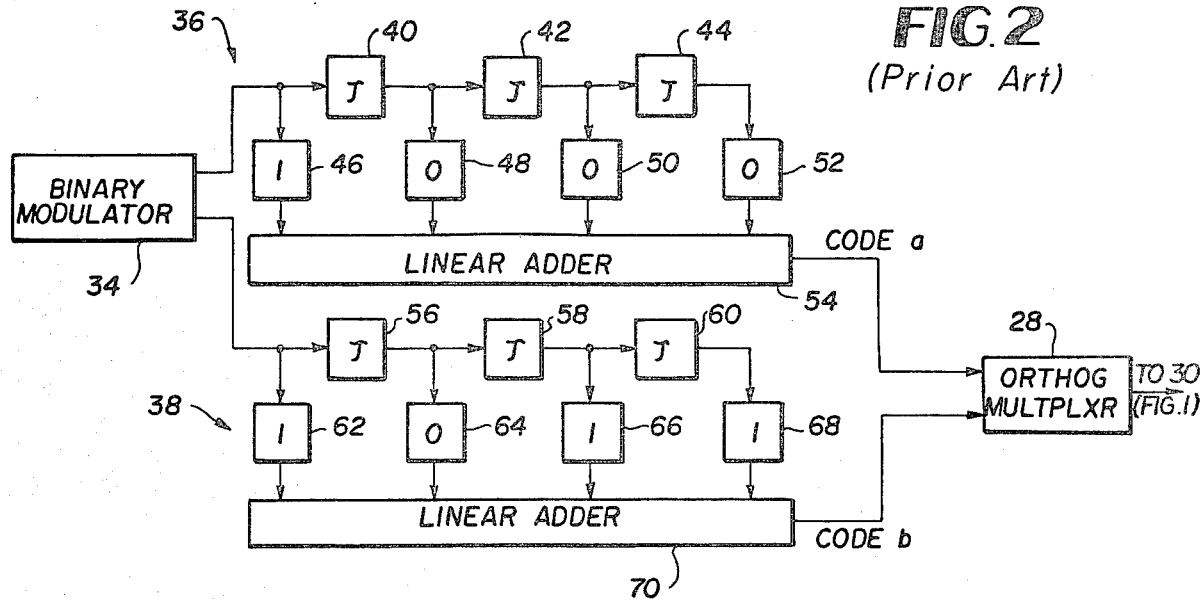
FIG. 2 is a functional block diagram illustrative of a multiplexed noise code generator utilized in the transmitter portion of the communications link shown in FIG. 1.

Prior to considering the operation of the pulse interference canceller 10, reference will first be made to FIGS. 2, 3 and 4 which are intended to illustrate the manner in which two four-bit orthogonally multiplexed noise codes a and b, comprising the code mate pair utilized in the system shown in FIG. 1, are generated and detected.

Consider, for example, a code mate pair wherein code a=1000 while code b=1011, and where 0 indicates a positive polarity signal of unit amplitude and 1 indicates a negative polarity signal of unit amplitude. As shown in FIG. 2, a binary modulator 34 couples to a pair of binary multi-bit code generators 36 and 38 which generate code a and code b, respectively. Code generator 36 is comprised of three delay lines 40, 42 and 44 as well as four phase control circuits 46, 48, 50 and 52 which couple to a linear adder 54. The "1" or "0" associated with these four phase control circuits signify a phase operation where the "1" signifies a phase reversal of 180° while a "0" signifies no phase reversal or zero degree phase shift. The time delay circuits 40, 42 and 44 are adapted to provide a time delay ($\tau$) which is the time width of one code bit of the multi-bit code. In a like manner, the code b generator 38 includes three time delay circuits 56, 58 and 60 as well as four phase control circuits 62, 64, 66 and 68 which couple to a linear adder 70. Further as shown, both linear adders 54 and 70 couple to the multiplexer 28 which is shown in FIG. 1 coupled to the modulator 30.

Figure 3:
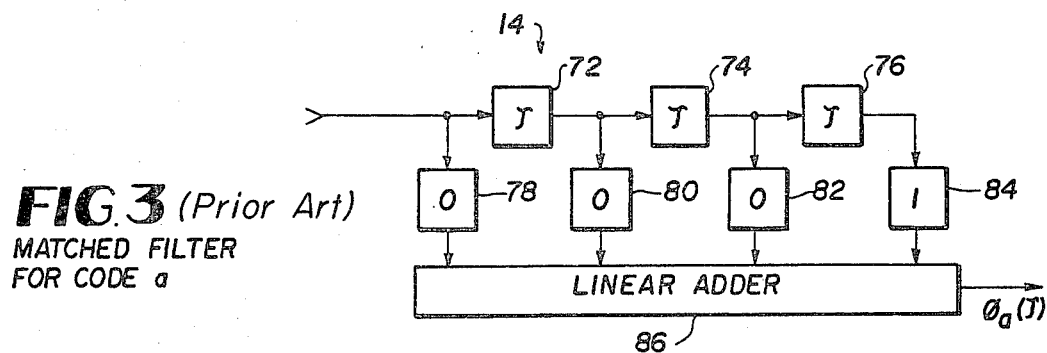
FIGS. 3 and 4 are functional block diagrams illustrative of matched filters for the two multiplexed noise codes generated by the noise code generator shown in FIG. 2.
Figure 4:
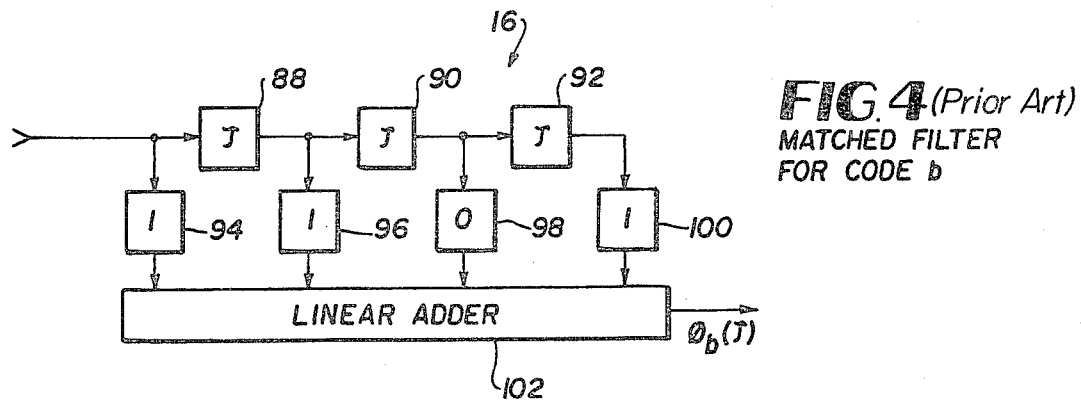

Referring now to FIGS. 3 and 4, the matched filters 14 and 16 for codes a and b, respectively, include a set of phase control circuits having a bit sequence which is an inversion of codes a and b. Accordingly, the matched filter 14 provides an inversion sequence of 0001 for code a while the matched filter 16 provides an inversion sequence of 1101 for code b. As shown in FIG. 3, the matched filter 14 is comprised of time delay circuits 72, 74 and 76 along with phase control circuits 78, 80, 82 and 84 which are coupled to a linear adder 86. The matched filter 16 for the code b as shown in FIG. 4 is comprised of time delay circuits 88, 90 and 92 along with phase control circuits 94, 96, 98 and 100 coupled to a linear adder 102.

Referring now back to FIG. 1 and considering the pulse interference canceller 10, it is shown comprised of a variable time delay circuit 13 configured, for example, from a delay line and a linear adder 15. The variable delay provided by the delay circuit 13 is on the order of magnitude of $\tau$ which is also equal to the width of the impulse autocorrelation function output of the linear adder 12; however, it is additionally able to provide a Vernier time delay of the magnitude $\epsilon$, where $\epsilon < \tau$, and thereby provide an overall delay of $\tau_0 = \tau + \epsilon$. The purpose of the two time delays $\tau + \epsilon$ is to provide an exact phaseshift of 180° for an interfering pulse received along with the noise coded signal and occurring in time coincidence with the impulse autocorrelation function of the noise code mate pairs followed matched filter detection. A gate circuit 17 having an input adapted to receive an enabling signal at a time $T_0$ is coupled to the linear adder 15 to gate out the impulse signal output of the adder at $T_0$.

Thus a combined input RF signal, including an interference pulse signal and the noise coded signal, is received, matched filter detected, linearly added and fed to circuit junction 19. A pulse interference signal appearing at junction 19 is coupled to the linear adder 15 via circuit lead 21 along with a pulse which is a replica of itself and is exactly 180° degrees out of phase, provided by the delay circuit 13. One pulse signal subtracts from the other in the adder 15 resulting in a total cancellation of the interference pulse. However, the impulse autocorrelation function signal, which results from matched filter outputs being compressed to a lobeless impulse by the linear adder 12 and also appearing at circuit junction 19, remains the same at the output of the linear adder 15 without reducing the amplitude of the desired noise coded signal with one exception, a doubling ($2\tau$) of the compressed code bit duration occurs. If, however, the gate 17 is enabled at a time period $T_0$ which is coincident with one of the two bit durations, an output signal occurs which has a peak level the same as that appearing at the input to the canceller 10 but one devoid of the pulse interference signal.

This is readily demonstrated with the following example. Where as noted above code a=1000 and code b=1011, compressing code a in its matched filter 14, providing an inversion sequence of 0001, results in autocorrelation output $\phi_a(\tau)$ being generated in the manner shown below as,

| Bit time slot # | 1 | 2 | 3 | 4 | 5 | 6 | 7 |
|---|---|---|---|---|---|---|---|
| Inv. Seq. | | 0 | 1 | 0 | 0 | 0 | | |
| | | 0 | | 1 | 0 | 0 | 0 | |
| | | 0 | | | 1 | 0 | 0 | 0 |
| | | 1 | | | | 0 | 1 | 1 | 1 |
| $\phi_a(\tau) =$ | 1 | . | 0 | $0^4$ | 0 | . | 1 |

The exponent indicates the amplitude of the signal while the dot represents a zero amplitude.

Compressing code b in matched filter 16, providing an inversion sequence of 1101, yields an autocorrelation output $\phi_b(\tau)$ shown below as,

| Bit time slot # | 1 | 2 | 3 | 4 | 5 | 6 | 7 |
|---|---|---|---|---|---|---|---|
| Inv. Seq. | 1 | 0 | 1 | 0 | 0 | | |
| | 1 | 0 | 1 | 0 | 0 | | |
| | 0 | | 1 | 0 | 1 | 1 | |
| | | 1 | | 0 | 1 | 0 | 0 |
| $\phi_b(\tau) =$ | 0 | . | 1 | $0^4$ | 1 | . | 0 |

The composite compressed output comprises a linear addition of $\phi_a(\tau)$ and $\phi_b(\tau)$ in linear adder 12 which in turn produces a lobeless impulse signal $\phi_T(\tau)$, as shown below,

| Bit time slot # | 1 | 2 | 3 | 4 | 5 | 6 | 7 |
|---|---|---|---|---|---|---|---|
| $\phi_a(\tau)$ | 1 | . | 0 | $0^4$ | 0 | . | 1 |
| $\phi_b(\tau)$ | 0 | . | 1 | $0^4$ | 1 | . | 0 |
| $\phi_T(\tau) =$ | . | . | . | $0^8$ | . | . | . |

Considering now the presence of a strong input interfering pulse x where x represents a signal amplitude much greater than 1 and which occurs in the third bit time slot of code a. Compressing code a along with the interfering pulse x in matched filter 14 results in the following output:

| Bit time slot # | 1 | 2 | 3 | 4 | 5 | 6 | 7 |
|---|---|---|---|---|---|---|---|
| Inv. Seq. | 0 | 1 | 0 (x) | 0 | 0 | | |
| | 0 | | 1 | 0 (x) | 0 | 0 | |
| | 0 | | | 1 | 0 (x) | 0 | 0 |
| | | | | | | $\bar{x}$ | |
| | 1 | | | 0 | 1 | 1 | 1 |
| OUTPUT$_1 =$ | 1 | . | 0 (x) | $0^4$ (x) | 0 (x) | $\bar{x}$ | 1 | where $0^y$ signifies a composite signal amplitude of $(y + x)$ and wherein $\bar{x} = -x$.

Compressing code b as before in matched filter 16 yields the following output:

| Bit time slot # | 1 | 2 | 3 | 4 | 5 | 6 | 7 |
|---|---|---|---|---|---|---|---|
| Inv. Seq. | 1 | 0 | 1 | 0 | 0 | | |
| | 1 | 0 | 1 | 0 | 0 | | |
| | 0 | | 1 | 0 | 1 | 1 | |
| | | 1 | | 0 | 1 | 0 | 0 |
| OUTPUT$_2 =$ | 0 | . | 1 | $0^4$ | 1 | . | 0 |

Adding the two outputs together results in a composite compressed output lobeless impulse signal $\phi_T(\tau)$ plus interfering pulses being formed and shown below as,

| Bit time slot # | 1 | 2 | 3 | 4 | 5 | 6 | 7 |
|---|---|---|---|---|---|---|---|
| OUTPUT$_1$ | 1 | . | 0 (x) | $0^4$ (x) | 0 (x) | $\bar{x}$ | 1 |
| OUTPUT$_2$ | 0 | . | 1 | $0^4$ | 1 | . | 0 |
| OUTPUT = | . | . | x | $0^8$ (x) | x | $\bar{x}$ | . |

It can be seen now that the amplitude of the desired signal has increased to $0^8$, as before, but the interfering pulse x spreads coherently over four time slots, i.e. Nos. 3 through 6, without any increase in level in any of the time slots including time slot number 4 which contains the desired signal.

Considering now the presence of the pulse interference canceller 10 which provides a delay $\tau_0 = \tau + \epsilon$ to the compressed signal $\phi_T(\tau)$ as well as the interference, adding the two together in the linear adder 15 yields a signal $\Sigma_\phi$ which is shown below as,

| Bit time slot # | 1 | 2 | 3 | 4 | 5 | 6 | 7 |
|---|---|---|---|---|---|---|---|
| | . | . | x | $0^8$ (x) | x | $\bar{x}$ | . |
| $\Sigma\phi =$ | . | . | . | x, $0^8$ | x, $0^8$ | x, $\bar{x}^2$ | $\bar{x}$ |
| | . | . | x, $0^8$ | $0^8$ | $\bar{x}^2$ | x | |
| | | | →  | \| | \| | ←T$_0$ | |

It can be seen then that time slots 4 and 5 are free of interference and consist of lobeless impulse signals having an amplitude of $0^8$. While either or both of the lobeless impulse signals in time slots 4 and 5 could be gated out via the gate 17 shown in FIG. 1, the gate position T$_0$ is shown in the above example delayed one bit to account for a situation where the interfering pulse occurs during the last bit.

The subject invention thus enables strong pulse interference to be completely cancelled without experiencing any loss in the desired signal which reflects an anti-jam gain margin which approaches infinity and thus is able to eliminate the effectiveness of pulse jamming against digital communication systems. It should also be mentioned that in a situation where the frequency of the interfering pulse is varied from pulse to pulse from an interfering pulse train, then a closed loop would be utilized wherein the output interference would be continuously monitored using an appropriate type of null detector and the variable delay $(\tau + \epsilon)$ continuously adjusted to maintain the interference at a null or zero level in accordance with the output of the null detector, not shown, much in the same fashion as taught in U.S. Pat. No. 4,027,264, entitled, "Phase Lock Loop Multi-Tone Interference Cancelling System", issued to Frank S. Gutleber on May 31, 1977, wherein a phase lock loop is utilized as a narrow band tracking filter to adaptively lock to interference tones to be cancelled by a process of signal subtraction.

While there has been shown and described what is at present considered to be the preferred embodiment of the invention, the same has been made by way of illustration and not limitation. Accordingly, all alterations, modifications and changes coming within the spirit and scope of the invention, as defined in the following claims, are meant to be included.

I claim:

1. A noise coded communications system, comprising:
   means for generating and transmitting a multiplexed noise coded communications signal formed as a continuous stream of bits;
   means for receiving said noise coded communications signal as a continuous stream of bits and any interference signals including a pulse interference signal which forms thereby a combined received signal;
   means included in said receiving means for compressing said noise coded communications signal to an impulse; and
   means included in said receiving means and coupled to said compressing means for cancelling said pulse interference signal of said combined received signal, said cancelling means comprising first circuit means providing substantially no delay of both the compressed noise coded communications signal and said pulse interference signal of said combined received signal, second circuit means providing a predetermined time delay of both said compressed noise coded communications signal and said pulse interference signal, said delay being of the magnitude to shift said interference pulse signal in phase by 180°, and third circuit means combining the non-delayed and delayed signals from said first and second circuit means whereby said pulse interference signal is summed with a phase reversed replica of itself which results in a cancellation thereof while an interference free impulse output signal is provided.

2. The communications system as defined in claim 1 wherein said orthogonal noise coded communications system comprises a multi-bit binary digital code of substantially equal bit widths and wherein said second circuit means provides a delay of substantially one bit width of said noise code.

3. The communications system as defined by claim 1 wherein said orthogonal noise coded communications signal comprises a pair of continuous-stream multi-bit digital noise codes having respective autocorrelation functions which compress to an impulse and wherein said means for compressing said noise coded communications signal to an impulse additionally includes means for combining a pair of compressed noise codes to provide a lobeless impulse of a predetermined width and wherein said second circuit means provides a time delay substantially equal to the width of the lobeless impulse.

4. The communications system as defined by claim 3 and additionally including gate circuit means coupled to said cancelling means and being enabled at a predetermined time to translate said lobeless impulse signal therethrough.

5. The communications signal as defined by claim 3 where said second circuit means comprises a variable delay line circuit and said third circuit means comprises a linear adder.

6. The communications signal as defined by claim 5 wherein said variable time delay circuit is adapted to delay said pulse interference signal and said compressed noise coded communications signal by a time $(\tau+\epsilon)$ equal to the bit width of said lobeless impulse and a predetermined relatively small additional incremental time delay to provide said 180° phase shift of said pulse interference signal relative to said pulse interference signal having no delay.

7. The noise coded communications system as defined by claim 1 wherein said orthogonal noise coded communications signal comprises a pair of multiplexed, multi-bit noise codes having respective autocorrelation functions which compress to an impulse upon detection and when combined form a lobeless impulse.

8. The communications system as defined by claim 7 wherein said receiving means includes means for demultiplexing said multiplexed noise codes, and
   wherein said means for compressing said noise coded communications signal comprises first and second autocorrelation detector means for respectively autocorrelation detecting the pair of demultiplexed noise codes, and means for linearly combining the autocorrelation detected codes for compressing the respective autocorrelation functions to a lobeless impulse.

9. The communications system as defined by claim 8 wherein said second circuit means comprises a delay line circuit and said third circuit means comprises a linear adder whereby the impulse output signal is double the pulsewidth of one code bit width.

10. The communications system as defined by claim 9 and additionally including gate circuit means coupled to said cancelling means and being operable for at least one code bit width and enabled at a time coincident with said impulse output signal to gate out said lobeless impulse output signal.

11. The communications system as defined by claim 1 and additionally including gate circuit means coupled to said linear adder and being operable at a time coincident with said lobeless impulse output signal to translate at least one code bit width of said impulse output signal.

* * * * *